US010443359B2

(12) United States Patent
DeValve et al.

(10) Patent No.: US 10,443,359 B2
(45) Date of Patent: Oct. 15, 2019

(54) MULTILATERAL WELL OPTIMIZATION AND SYSTEM

(71) Applicants: Caleb J. DeValve, Spring, TX (US); Scott R. Buechler, Spring, TX (US); Steven D. Dornic, The Woodlands, TX (US)

(72) Inventors: Caleb J. DeValve, Spring, TX (US); Scott R. Buechler, Spring, TX (US); Steven D. Dornic, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 245 days.

(21) Appl. No.: 15/591,790

(22) Filed: May 10, 2017

(65) Prior Publication Data

US 2018/0030816 A1    Feb. 1, 2018

Related U.S. Application Data

(60) Provisional application No. 62/381,931, filed on Aug. 31, 2016, provisional application No. 62/367,888, filed on Jul. 28, 2016.

(51) Int. Cl.
| *E21B 34/06* | (2006.01) |
| *E21B 41/00* | (2006.01) |
| *G05D 7/06* | (2006.01) |
| *E21B 43/14* | (2006.01) |
| *E21B 43/16* | (2006.01) |

(52) U.S. Cl.
CPC .......... *E21B 41/0092* (2013.01); *E21B 34/06* (2013.01); *E21B 41/0035* (2013.01); *E21B 43/14* (2013.01); *E21B 43/16* (2013.01); *G05D 7/0641* (2013.01)

(58) Field of Classification Search
CPC .................................................. E21B 41/0035
USPC ..................................................... 166/250.15
See application file for complete search history.

(56) References Cited

U.S. PATENT DOCUMENTS

| 8,914,268 B2 | 12/2014 | Dale et al. | |
| 2005/0121190 A1* | 6/2005 | Oberkircher | E21B 41/0035 166/250.1 |
| 2016/0369590 A1* | 12/2016 | Tonkin | G05B 15/02 |

* cited by examiner

*Primary Examiner* — Taras P Bemko
(74) *Attorney, Agent, or Firm* — ExxonMobil Upstream Research Company—Law Department (57) ABSTRACT

Provided are methodologies and systems employing an array of independently operated flow control valves at an uphole location in each of a plurality of legs of a multilateral well to facilitate resolution and effective execution of efficient production plan and to improve performance. Along each leg of the multilateral well, a flow-control valve may be located downhole of a confluence between the respective leg and another leg and uphole of the well completion portion (production and/or injection component) of the respective leg. Each valve is operable independently of each other and of any valving in the completion component. Data regarding the nature and rate of production from each leg may be acquired from downhole sensors located at or about each flow control valve. The acquired data may be processed through a reservoir-well computerized model to resolve optimal valve settings across the valve array.

32 Claims, 7 Drawing Sheets

MULTILATERAL WELL OPTIMIZATION AND SYSTEM

CROSS REFERENCE TO RELATED APPLICATION

This application claims the benefit of U.S. Provisional Application Ser. No. 62/381,931 filed Aug. 31, 2016 and U.S. Provisional Application Ser. No. 62/367,888 filed Jul. 28, 2016 entitled, "Multilateral Well Optimization and System," the disclosures of which are incorporated herein by reference in their entireties.

FIELD

The present disclosure relates generally to systems and methods of optimizing production from a multilateral well and a system to accomplish same. More specifically, the present disclosure relates to optimizing production from a multilateral well by operating in each lateral leg of the multilateral well a flow control valve in an uphole relation to its production zone in accordance with a production target for the well and a reiterated assessment of progress against the plan.

BACKGROUND

Hydrocarbon fluids such as oil and natural gas are obtained from a subterranean geologic formation or reservoir, by drilling a well that penetrates the hydrocarbon-bearing formation. Once a wellbore is drilled, various forms of well completion components may be installed to control and enhance the efficiency of producing various fluids from the reservoir.

SUMMARY

The present disclosure provides a system operative in a multilateral well comprising a plurality of legs, a completion component at a location along each of the legs operative to produce a production flow in the respective leg, and a confluence where production flows from a first leg and a second leg commingle, the system comprising a multilateral flow control valve array which comprises a flow control valve at a location along each of the legs, the location being in an uphole relation to the completion component of the respective leg, and a control arrangement to adjust a setting of each flow control valve independently of one another and independently of operation of the respective completion components. For each respective leg, the confluence between the respective leg and a second leg is in an uphole relation to the valve of the respective leg. In other embodiments, the flow control valve is at a location along each of the legs, and for each respective leg, the location of the flow control valve is between the completion component of the respective leg and a confluence between the respective leg and a second leg. The completion component may itself include at least one of an ICD (in-flow control device), an ICV (in-flow control valve), a valve, a nozzle and/or a choke.

In an embodiment, the control arrangement may include a reservoir-well simulation, and the control arrangement may be programmed to establish respective valve sizes and initial valve settings upon a running of the reservoir-well simulation with an input of a production target. The adjustable valve setting may comprise a value indicative of a percentile opening of the respective flow control valve.

In an embodiment the control arrangement monitors for an indicator of a negative production event amongst the lateral legs, which may comprise a water production, a gas production, a sand production, a compaction or a combination of any of the foregoing.

The control arrangement may be programmed such that upon a detection of a negative production event in an affected one of the lateral legs, it reduces the respective valve setting to a lesser opening. In some circumstances, the respective valve setting may be reduced, such that an uplift in production is predicted, and in other circumstances it may be reduced significantly such as to approximately 20% open or less in the affected lateral leg.

In some embodiments, the locations of the first and second flow control valves are 500 feet or less downhole from the confluence of the lateral legs.

In an embodiment, the control arrangement is programmed to produce a production forecast comprising simulated well performance over time as a function of simulated valve sizes and simulated valve settings of simulated, flow control valves.

The disclosure also provides a method of optimizing production from a multilateral well comprising: producing a flow from a production portion of each lateral leg of the multilateral well, operating a flow control valve at a location along each respective lateral leg of the multilateral well wherein the location is in an uphole relation to the production portion of the respective lateral leg, commingling the produced flow of each respective lateral leg with the produced flow of a second lateral leg at a confluence that is in an uphole relation to the valve of the respective lateral leg, monitoring production of each lateral leg of the multilateral well and adjusting operation of one or more of the in-flow control valves responsively to a variance between the monitored production and a production target, and/or a detection of a production adverse event, wherein the adjusting includes running a computerized reservoir-well simulation of the multilateral well to resolve responsive, simulated valve settings of simulated, flow control valves and adjusting the settings of the flow control valves of the multilateral well accordingly.

Included in the disclosure is a method of managing production of a multilateral well comprising a plurality of well completions, a plurality of lateral legs communicating the plurality of well completions with an uphole string and a plurality of flow control valves at locations along the lateral legs in an uphole relation to the well completions, the method comprising setting a production target, running a model reservoir-well simulation of the multilateral well including simulated, flow control valves along simulated legs in an uphole relation to simulated well completions to generate a production forecast comprising simulated well performance over time as a function of simulated valve sizes and simulated valve settings of the simulated, flow control valves, generating well production data while operating the flow control valves of the multilateral well in accordance with the simulated valve sizes and the simulated valve settings, updating the model reservoir-well simulation responsively to the generated well production data, comparing the generated well production data to the production target and running the model reservoir-well simulation to establish a revised production forecast and/or to establish revised valve settings for the flow control valves, and repeating the generating, the updating and the comparing during a production life of the well.

In an embodiment the method further comprises, while running the model reservoir-well simulation, inputting the production target to establish the sizes of the flow control valves of the multilateral well. In still other embodiments, the generating production data may include monitoring for an indicator of a negative production event amongst the lateral legs and the monitoring and establishing revised valve settings may include: upon detecting a negative production event in an affected one of the lateral legs, changing the respective valve setting to a value in the range of 0 to 100% open in the affected lateral leg such that an uplift in production over time is predicted.

The disclosure also provides a system associated with production of hydrocarbons, comprising: a computerized reservoir-well simulation of a multilateral well comprising a plurality of well completions, a plurality of lateral legs communicating the plurality of well completions with an uphole string and a plurality of flow control valves at locations along the lateral legs in an uphole relation to the well completions, a first sensor responsive to production from a first well completion of a multilateral well; a second sensor responsive to production from a second well completion of a multilateral well, a first flow control valve operable at a location in an uphole relation to a completion component of a first leg of a multilateral well and operable to selectively control a first flow of production from the first leg according to a first adjustable valve setting, a second flow control valve operable at a location in an uphole relation to a completion component of a second leg of a multilateral well and operable to selectively control a second flow of production from the second leg according to a second adjustable valve setting, wherein the locations of the first and second flow control valves are in a downhole relation to a confluence of flows from the first and second legs, a controller programmed to monitor production by generating production data based upon an output of a sensor of the multilateral well, update the computerized reservoir-well simulation based upon an output of a sensor of the multilateral well, run the computerized reservoir-well simulation to generate a production forecast responsive to the production target and executing a control strategy for the first and second flow control valves of the multilateral well consistent with the production forecast, and compare the generated production data to the production target and adjusting execution of the control strategy responsively to the comparison.

In an embodiment, the controller is further programmed to establish respective sizes and initial valve settings of the flow control valves of the multilateral well upon a running of the reservoir-well simulation with an input of a production target and in another embodiment the monitoring includes monitoring for an indicator of a negative production event amongst the lateral legs and in yet another embodiment the production forecast comprises simulated well performance over time as a function of simulated valve sizes and simulated valve settings of simulated, flow control valves.

The disclosure further provides a multilateral flow control valve array operative in a multilateral well comprising a plurality of lateral legs, a completion component at a location along each of the lateral legs operative to produce a production flow into the respective lateral leg and a confluence where production flows commingle. The multilateral flow control valve array comprises a flow control valve at a location along each of the legs and a control arrangement to adjust a setting of each flow control valve independently of one another and independently of operation of the respective completion components. For each respective leg, the location of the valve is in an uphole relation to the completion component of the respective leg and production flows of the respective leg and a second leg comingle at a confluence that is in an uphole relation to the valve of the respective leg.

In an embodiment, the completion component is an injector, the flow control valve comprises an injection-flow control valve and the operational target is at least one of an injection target and a production target.

In another embodiment, the first leg is a production leg and the second leg is an injection leg, and in yet another embodiment, the first leg is a mother leg, and the array further comprises sets of first and second flow control valves at spaced locations along the mother leg.

BRIEF DESCRIPTION OF THE DRAWINGS

While the present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present disclosure. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation.

DETAILED DESCRIPTION

Terminology

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present disclosure described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Above/below: In the following description of the representative embodiments of the disclosure, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Couple: Any use of any form of the terms "connect", "engage", "couple", "attach", or any other term describing an interaction between elements is not meant to limit the interaction to direct interaction between the elements and may also include indirect interaction between the elements described.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

Exemplary: "Exemplary" is used exclusively herein to mean "serving as an example, instance, or illustration." Any embodiment described herein as "exemplary" is not necessarily to be construed as preferred or advantageous over other embodiments.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time. In some examples, methods may be implemented as processor executable instructions. Thus, a machine-readable medium may store processor executable instructions that if executed by a machine (e.g., processor) cause the machine to perform a method.

Full-physics: As used herein, the term "full-physics," "full physics computational simulation," or "full physics simulation" refers to a mathematical algorithm based on first principles that impact the pertinent response of the simulated system.

May: Note that the word "may" is used throughout this application in a permissive sense (i.e., having the potential to, being able to), not a mandatory sense (i.e., must).

Operatively connected and/or coupled: Operatively connected and/or coupled means directly or indirectly connected for transmitting or conducting information, force, energy, or matter.

Optimizing: The terms "optimal," "optimizing," "optimize," "optimality," "optimization" (as well as derivatives and other forms of those terms and linguistically related words and phrases), as used herein, are not intended to be limiting in the sense of requiring the present disclosure to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present disclosure, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

Order of steps: It should also be understood that, unless clearly indicated to the contrary, in any methods claimed herein that include more than one step or act, the order of the steps or acts of the method is not necessarily limited to the order in which the steps or acts of the method are recited.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Description

Reference will now be made to exemplary embodiments and implementations. Alterations and further modifications of the inventive features described herein and additional applications of the principles of the disclosure as described herein, such as would occur to one skilled in the relevant art having possession of this disclosure, are to be considered within the scope of the disclosure. Further, before particular embodiments of the present disclosure are disclosed and described, it is to be understood that this disclosure is not limited to the particular process and materials disclosed herein as such may vary to some degree. Moreover, in the event that a particular aspect or feature is described in connection with a particular embodiment, such aspects and features may be found and/or implemented with other embodiments of the present disclosure where appropriate. Specific language may be used herein to describe the exemplary embodiments and implementations. It will nevertheless be understood that such descriptions, which may be specific to one or more embodiments or implementations, are intended to be illustrative only and for the purpose of describing one or more exemplary embodiments. Accordingly, no limitation of the scope of the disclosure is thereby intended, as the scope of the present disclosure will be defined only by the appended claims and equivalents thereof.

In the interest of clarity, not all features of an actual implementation are described in this disclosure. For example, some well-known features, principles, or concepts, are not described in detail to avoid obscuring the disclosure. It will be appreciated that in the development of any actual embodiment or implementation, numerous implementation-specific decisions may be made to achieve the developers' specific goals, such as compliance with system-related and business-related constraints, which will vary from one implementation to another. For example, the specific details of an appropriate computing system for implementing methods of the present disclosure may vary from one implementation to another. Moreover, it will be appreciated that such a development effort might be complex and time-consuming, but would nevertheless be a routine undertaking for those of ordinary skill in the art having the benefit of the present disclosure.

The disclosure herein generally provides methodologies and systems comprising an array of independently operated flow control valves in a plurality of legs of a multilateral well to facilitate resolution and effective execution of efficient production plan and to improve performance. In some embodiments, each leg includes a well completion component (for production and/or injection) and a flow-control valve located along the leg in an uphole relation to the well completion portion of the leg. In some embodiments, the control valves are operable independently of each other and independently of any valving in the completion component. Data regarding the nature and rate of production from each leg may be acquired from downhole sensors located at or about each flow control valve, in some embodiments, immediately downstream of each flow control valve. The acquired data may be processed through a reservoir-well computerized model to resolve optimal valve settings across the valve array. In lieu or in addition, data may be acquired from sensors indigenous to the respective completion components, if available. The system provides a capacity to optimize production from the multilateral well by controlling relative production output of each lateral leg of the multilateral well in accordance with a plan to achieve a long-term production target for the well and a reiterated assessment of progress against the plan. The valve settings are adjusted according to output from running a computerized reservoir-well model that generates a production forecast comprising simulated well performance over time as a function of simulated valve sizes and simulated valve settings of a simulated, array of flow control valves as described herein.

Multilateral Well

Figure 1A:
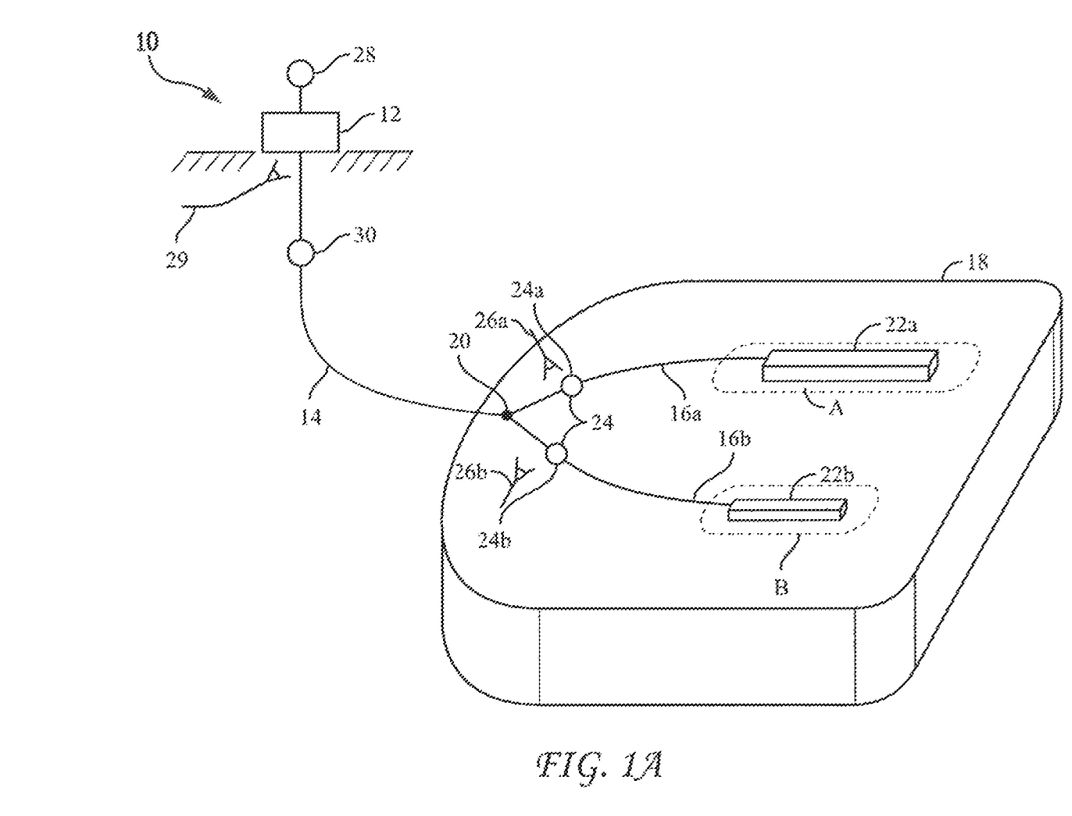
FIG. 1A is a schematic representation of a multilateral well configured in accordance with an exemplary embodiment of the disclosure, wherein a first set of flow control valves are located downhole of a first confluence.

Referring to FIG. 1A, in an embodiment, there is provided a multilateral well 10 for the production of a hydrocarbon comprising a wellhead 12, a common, uphole string (tubular) 14 and a plurality of lateral strings (lateral tubulars or "legs") 16. The uphole string 14 and the plurality of legs 16 may be associated with wellbores (not shown in FIG. 1A) through various subterranean strata and portions of the reservoir 18. In some embodiments, the legs 16 extend into a subterranean reservoir 18 and production flows from each of the legs 16 commingle at a confluence 20. The confluence 20 may or may not correspond with where the wellbores associated with the lateral legs 16 physically connect or converge. For purposes of this disclosure, a given lateral leg (leg) extends inclusively from the respective completion to its confluence with another leg. In the case of a mother leg (a leg from which emanate two or more lateral legs such as leg 16a in FIG. 1C), the mother leg (leg) extends inclusively from its respective completion to its uppermost confluence with another leg.

In the exemplary embodiment, the reservoir 18 is an oil-bearing reservoir although the teachings herein may be applied to reservoirs bearing other fluids including gas. In the following description of the present exemplary embodiment, only a first leg 16a and a second leg 16b are described, however the number of legs 16 in a multilateral well 10 as taught herein may vary significantly from well to well and may include many more than just two.

In some embodiments, the lateral legs 16 communicate with the common, uphole string 14 via a single confluence 20, but in some embodiments that may not be so. In so far as the legs 16a and 16b may comprise a set, it is contemplated that more than one set of legs 16 might communicate with the same common, uphole string 14 at different confluences 20, although it is possible that they all do so at a common confluence 20 in some applications.

In the present embodiment, each leg 16 (e.g., each of legs 16a and 16b) includes a well completion component 22 (e.g., each of well completions 22a and 22b) which operate to introduce oil flow into each of the respective legs 16. Each leg 16 further comprises a flow control valve 24 located in an uphole relation to each completion component 22 (or downstream of each completion component 22 in the sense of the direction of fluid flow from the completion 22 to the wellhead 12). In some embodiments, each leg 16 of the multilateral well system is further provided with a sensor 26 that is operative to generate a signal indicative of flow conditions along the leg 16, such as at or about each valve 24. In an embodiment, the output of the sensor may be communicated by wire to a control system 28 or in another embodiment, via wireless communication. In some applications, the sensor may comprise sensors which are indigenous to the completion component 22 of the leg 16.

Accordingly, in the exemplary embodiment, a set of legs 16 of a multilateral well 10 include individual legs 16a and 16b (whose production flows converge at a confluence 20), with each leg 16 including completion components 22a and 22b, optionally sensors 26a and 26b, respectively, and flow control valves 24a and 24b, respectively. In embodiments, the location of flow control valves 24a and 24b is in an uphole relation to the completion components 22a and 22b, respectively, and the confluence 20 of a respective leg 16a or 16b with the other leg 16a or 16b is in an uphole relation to the valve 24a or 24b of the respective leg 16a or 16b.

In an embodiment, the flow control valves 24a and 24b may be located near the confluence 20, 100 to 500 feet downhole, or even deeper from the confluence 20; however in other embodiments, the flow control valves 24a and 24b may be located adjacent (above or below) the physical junction of the wellbores associated with the legs 16a and 16b to facilitate their installation and operation. It is to be understood that the location of the physical junction of the wellbores associated with the legs 16a and 16b and location of the confluence 20, where flows of the lateral legs 16a and 16b comingle may differ.

In some embodiments, each flow control valve 24 is selectively and individually operable under a command of the control system 28 to open, to partially open (by degrees) or to close so as to control the output (incremental oil flow) of the respective leg 16 to the common, uphole string 14 (or wellhead 12), whereby the proportional contribution of each leg 16 to the grand total of flow at the well head 12 may be monitored, managed and optimized by the controller 28. Such is achievable without having to replace and/or change settings of the completion components 22.

In an embodiment, the common, uphole string 14 is provided with a sensor 29 in communication with the controller 28 and an adjustable choke (flow control valve) 30, which is arranged to control (limit) total flow to the wellhead 12.

The flow control valves 24 and 30 may comprise any of various flow control devices utilized by oil well operators to control downhole flows through a line (tubular or pipe) such as those made available by The Halliburton Company of Houston, Tex., Schlumberger Technology Corporation of Sugar Land, Tex., the Baker Hughes Incorporated, Weatherford International and other sources.

Figure 1B:
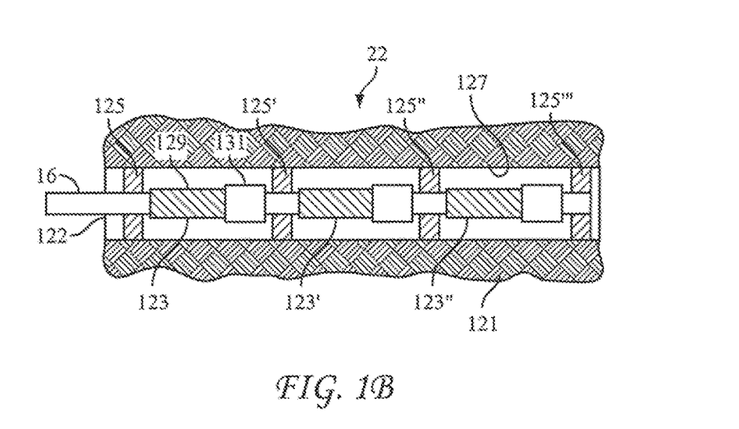
FIG. 1B a cross-sectional detailed view of an exemplary completion for inclusion in the multilateral well shown in FIG. 1A.

Referring now to FIG. 1B, each completion 22 of the present exemplary embodiment is configured for the production of hydrocarbon-bearing fluids and may comprise a string 121 of in-flow control devices (ICD's) 123, 123', 123" located within a wellbore 127 of a leg 16 in the formation of the reservoir 18. The ICD's 123 may each comprise a screen 129 and a housing portion 131 that includes internal nozzles and/or valves to control the rate of flow of formation fluids being drawn from the formation 121 to the wellhead 12 through the ICD's 123 and legs 16. The ICD's 123 may be remotely adjustable or fixed, and may be operatively separated from one another by a plurality packers 125, 125', 125", 125''' and are commercially available from Schlumberger Technology Corporation of Sugar Land, Tex., The Halliburton Company of Houston, Tex., the Baker Hughes Incorporated, Weatherford International and other sources. In practice the completion 22 may be configured differently and may be constructed from components entirely different from what is described herein with reference to FIG. 1B.

Figure 1C:
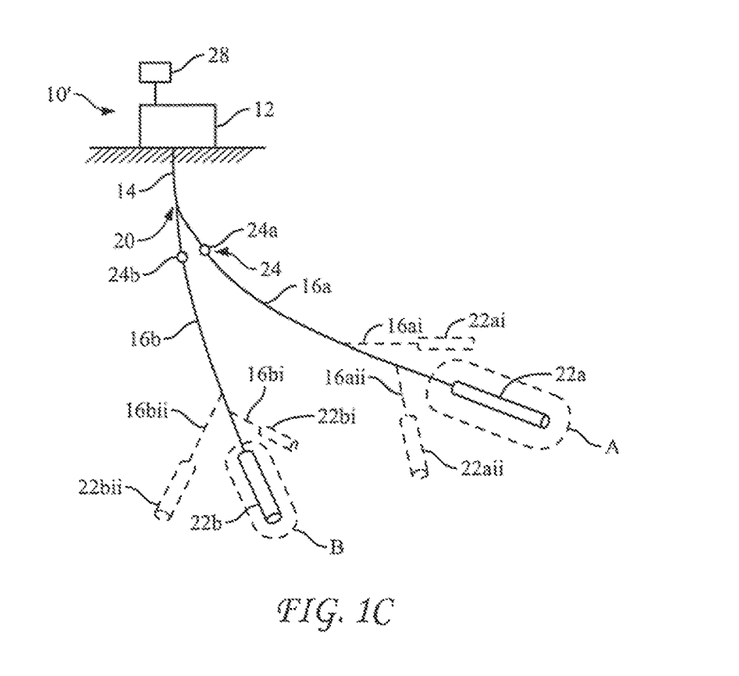
FIG. 1C is a schematic representation of a multilateral well configured in accordance with an exemplary embodiment shown in FIG. 1A, wherein additional lateral well legs (laterals) are shown with dashed lines.

Referring now to FIG. 1C, in another embodiment, a well 10' comprises legs 16a and 16b, additional, secondary laterals 16ai, 16aii and 16bi, 16bii, and completions 22ai, 22aii, and 22bi, 22bii, respectively. A set 24 of control valves (valves 24a and 24b) is located in an uphole relation to all of the completions 22a, 22b, 22ai, 22aii, and 22bi, 22bii and all of the secondary laterals 16ai, 16aii and 16bi, 16bii. Such arrangement, facilitates flow management of each main leg (mother bore) 16a and 16b and together with all their secondary laterals 16ai, 16aii and 16bi, 16bii, respectively, in a unitary manner, respectively. For each of the respective legs 16a and 16b, the confluence 20 of the legs 16a, 16b is in an uphole relation to the flow control valve 24a, 24b of the respective legs 16a and 16b.

Figure 1D:
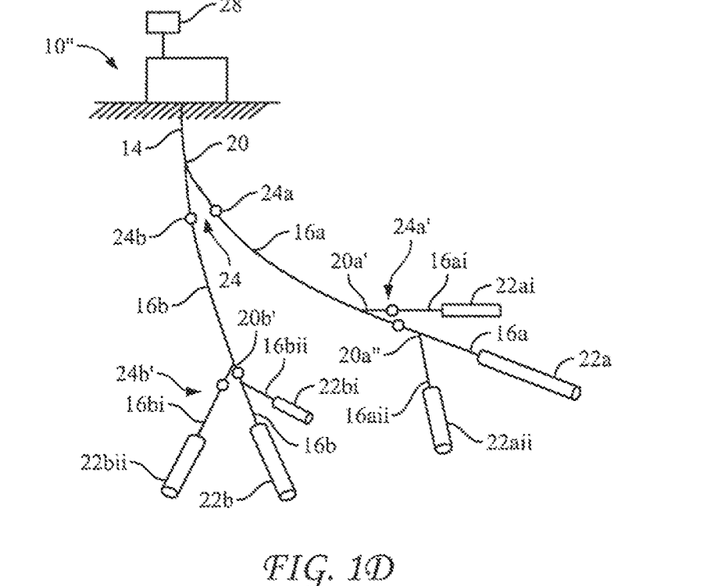
FIG. 1D is a schematic representation of a multilateral well configured in accordance with an exemplary embodiment shown in FIG. 1C, wherein additional sets of flow control valves have been added in accordance with another exemplary embodiment of the disclosure.

In another embodiment shown in FIG. 1D, a well 10" comprises the components of the previously described well 10' of FIG. 1C, further including additional sets of control valves 24a' and 24b' in a downhole relation to the next furthest downhole confluences 20a' and 20b' along the main laterals (mother bores) 16a and 16b. Such arrangement, facilitates flow management of each main leg (mother bore) 16a and 16b and together with separate flow management of at least some of their secondary laterals 16ai and 16bi, respectively.

Figure 1E:
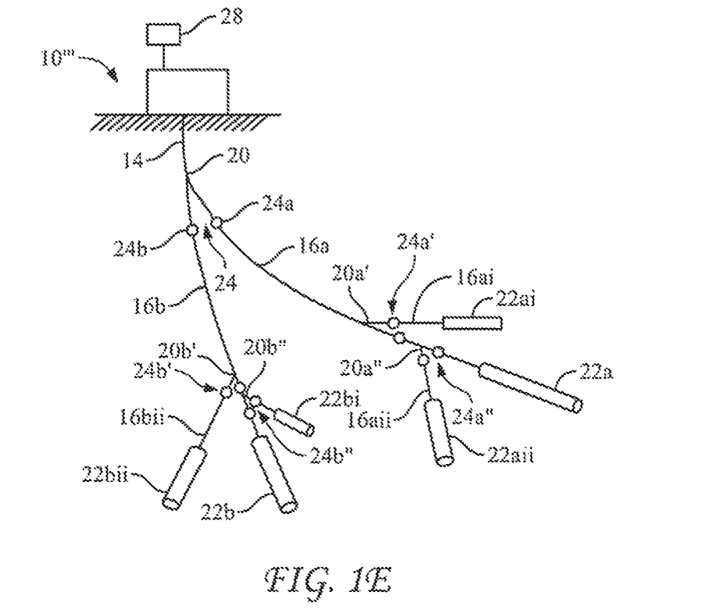
FIG. 1E is a schematic representation of a multilateral well configured in accordance with an exemplary embodiment shown in FIG. 1D, wherein further sets of flow control valves have been added in accordance with yet another exemplary embodiment of the disclosure.

In another embodiment shown in FIG. 1E, a well 10''' comprises the components of the previously described well 10" of FIG. 1D, further including additional sets of control valves 24a" and 24b" downhole of the next (the furthest downhole) confluences 20a" and 20b" along the main laterals (mother bores) 16a and 16b. Such arrangement, facilitates flow management of each main leg (mother bore) 16a and 16b, together with separate flow management of all of their secondary laterals 16ai, 16aii and 16bi, 16bii, respectively.

In other embodiments, the valve arrays shown in FIGS. 1D and 1E may be modified such that only a single flow control valve 24a is operative along the mother leg 16a (i.e., between the uphole string 14 and the completion 22a) and only a single flow control valve 24b is operative along the mother leg 16b (i.e., between the uphole string 14 and the completion 22b). In other embodiments the wells 10' and 10" may comprise only a single mother leg 16a or may comprise additional mother legs.

Production Management

Multilateral wells are increasingly implemented, because they offer increased production per length drilled, can save rig slots and decrease local draw downs throughout a reservoir. Heretofore, managing and optimizing production from multilateral wells has remained a challenge since production is coming from several separate legs in the reservoir which are commingled before arrival at the well head. Problems such as early water or gas breakthrough in any one leg may choke back overall production amongst the legs, even though the other, remaining legs may be producing oil in a water free (or gas free) condition. Such circumstance negates much of the value derivable from multilateral wells.

In addition, one lateral leg may be drilled into a high productive productivity zone and the other into a lower productivity zone but both my zones must be produced at equal rates to maximize capture or to effect favorable reservoir management. Such are but a few of the production challenges that may face operators of multilateral wells.

Inflow control devices (ICD's) and in-flow control valves (ICV's) are tools applied along a lower portion of a well completion that is in operation with the reservoir so as to favorably control local reservoir inflow from the reservoir into the completion. Surface chokes are located at the wellhead to choke back overall fluid flow. Absent from these devices is capacity to monitor and manage production contribution from each leg of a multilateral well to total production of the well so that the individual contributions of each leg to the total production may be managed and optimized over time and production-adverse events, such as a localized water breakthrough, may also be addressed optimally in like manner.

Figure 2A:
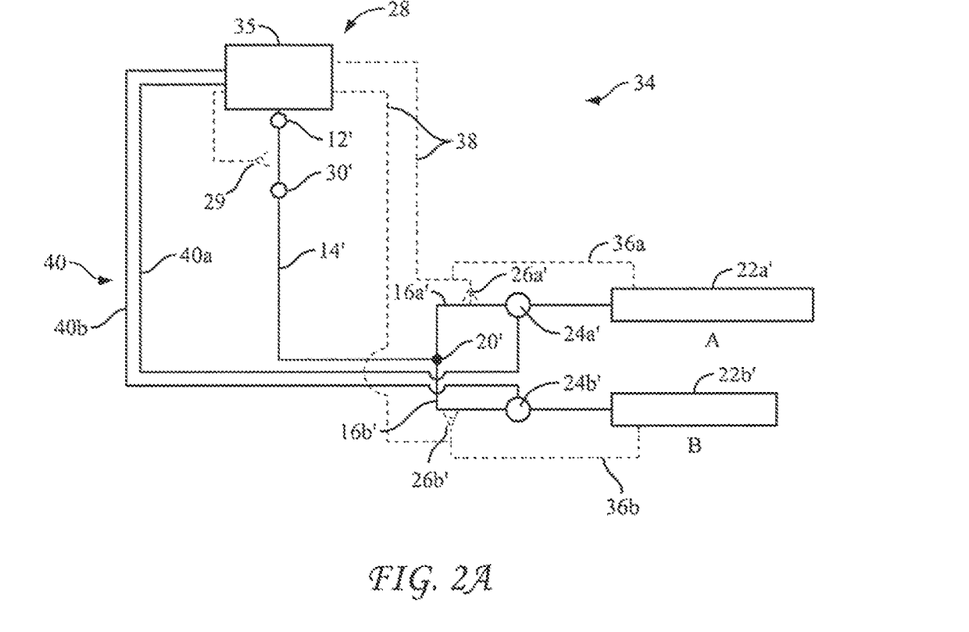
FIG. 2A is a schematic representation of a computerized, reservoir-well simulation (model) of the multilateral well of FIG. 1A.

In the following description, reference is made to: FIG. 1A which depicts the multilateral well 10 of as previously described; FIG. 2A which provides a representation of an exemplary computerized model 34 of the multilateral well 10; and FIG. 2B which provides a representation of an exemplary configuration of a controller system 28 of the multilateral well 10, which includes a link to the computerized model 34 that is shown in FIG. 2A.

Figure 2B:
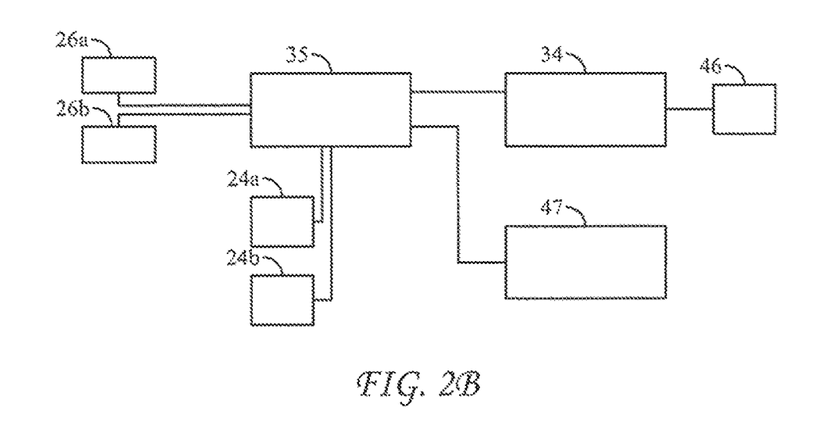
FIG. 2B is a schematic representation of the control system configured in accordance with the exemplary embodiment of FIG. 1A.

In reference to the embodiment of a multilateral well 10 described in the preceding section and in reference to FIGS. 2A and 2B, an exemplary embodiment includes a multilateral well 10 as previously described, a method of production management of the aforementioned well 10 and a control system 28 to execute the method, which includes resort to a computerized model (reservoir-well simulation) 34 of the multilateral well 10 and the reservoir 18. As such, the model 34 includes the analytical equivalents of the various components of the multilateral well 10, that being, by way of example, a well head 12', an uphole string 14', a confluence 20', a first leg 16a' having a flow control valve 24a' located in an uphole relation to the completion portion 22a' and a second leg 16' having a flow control valve 24b' located in an uphole relation to the completion portion 22b'. Also Included in the model are analytical equivalents of various components of the reservoir 18 (as known or analytically predicted), such as porosities, fluid loadings, temperatures and pressures and the like, including those parameters and others regarding local zones A and B of the reservoir 18 adjacent the well completions 22a and 22b, respectively of the multilateral well 10 (model zones A' and B' adjacent model well completions 22a' and 22b' of the model 34, respectively).

The computerized model (reservoir-well simulation) 34 of the multilateral well 10 and the reservoir 18 may be constructed and operated using commercially available software resources such as analytical software Reveal from Petroleum Experts Ltd. and software associated with modeling described in U.S. Pat. No. 8,914,268 (ExxonMobil Upstream Research Company), which patent is incorporated herein by reference in its entirety.

Figure 4:
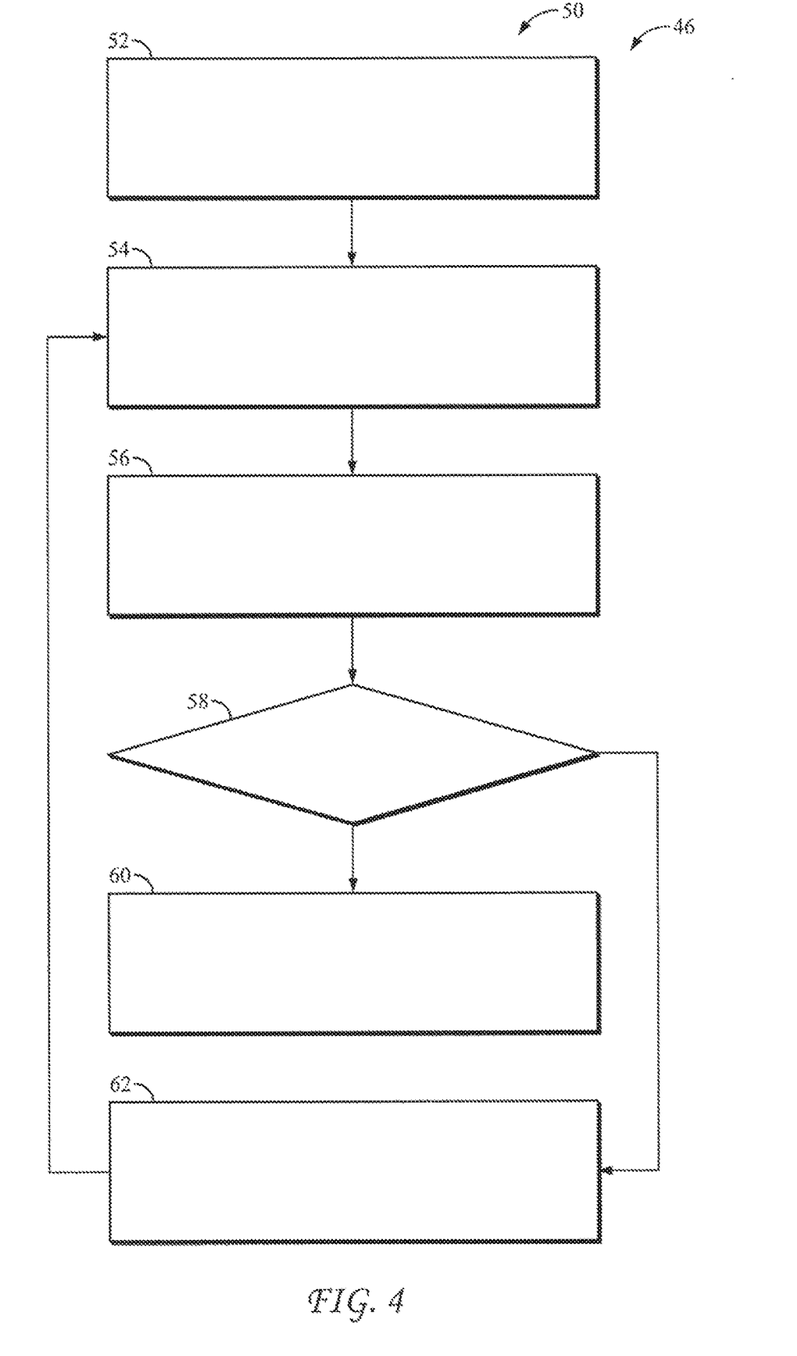
FIG. 4 is a flowchart of an exemplary method of production management of a multilateral well in accordance with an embodiment of the disclosure.

Referring now to FIGS. 2B and 4, in an embodiment, the control system 28 further includes a computerized, production management program 46 (or other form of executable logic sequence) which executes a routine corresponding to an exemplary method of production management 50 schematically represented in FIG. 4, in which a first step at block 52 of FIG. 4 may comprise inputting a production target (a total production target at the wellhead 12 or alternatively the production target of a particular leg 16).

Included also in FIG. 2A is a human interface 47 and a representation of the various lines of communication (by wire and/or wireless) between the controller 35 of the actual control system 28 and the various components of the multilateral well system 10, which are also represented in the lines of connection in FIG. 2B. In an embodiment, the lines of communication 36a, 36b between the controller 35 to the completions 22a and 22b, respectively, may facilitate utilization of sensors indigenous to the completions 22a and 22b, if available, in lieu of or in addition to the sensors 24a and 24b which communicate with the controller 35 via lines of communication 38. The output of the controller 28 is a command responsive to down-bore input received from the sensors 16a and 16b and/or the indigenous sensors and from a running of the computerized model (reservoir-well simulation) 34 to adjust or maintain the settings of each of the flow control valves 24a and 24b independently of one another and independently of adjustable settings already adjusted or being adjusted in the completion components 22a and 22b, if any. Communication between the controller 35 and the flow control valves 24a, 24b may be established via communication links 40a, 40b, respectively, which may be a wired, wireless or other suitable link.

Accordingly each of the flow control valves 24a and 24b may be individual operated (have its setting adjusted) to remain open or to be partially or fully closed responsively to the controller 28 such that total production at the wellhead 12 can be managed, monitored and optimized by managing, monitoring and optimizing the contribution of each leg 16a and 16b to the total production flow at the wellhead 12, without needing to change settings of the completions 22a and 22b (or if none, despite the lack of any capacity to change settings in the completions 22a and 22b). The arrangement also provides a capacity to use the sensors 24a and 24b to monitor for flow conditions indicative of a production-adverse event in or about each of the legs 16, such as a water breakthrough in leg 16a or leg 16b, by way of example. The control system 28 also provides the capacity to manage production from each of the unaffected and affected legs 16 after such an event in a manner that optimizes total production at the wellhead 12 over the time. Interestingly, the latter aspect can lead to cognizable gains in production in the long term, which aspect will be addressed in the section of this disclosure which follows.

Referring to FIG. 4, the computerized, production management program 46 (or other form of executable logic sequence) is coupled with the reservoir-well model 34 to execute routines corresponding to an exemplary method of production management 50 schematically represented in FIG. 4, in which a first step at block 52 may comprise inputting a production target (a total production target at the wellhead 12 or additionally or alternatively the production target of a particular leg 16a, 16b) and then in a step at block 54 to use the reservoir-well model 34 to generate (1) an initial and (subsequently) updated forecasts of production for each leg 16a and 16b and/or total production at the wellhead 12; and (2) an initial and (subsequently updated) flow-control strategy for adjusting valve settings of each of the flow control valves 24a and 24b for each of the legs 16a and 16b, respectively, to optimize total production from the multilateral well 10 over time.

Subsequently, as execution of a production plan including the aforementioned flow-control strategy and optimization progresses, the production of the well at the wellhead 12 and/or each of the legs 16 is monitored on a continuous, intermittent or more regular basis as part of a step at block 56 of the control logic 50. In execution of the step at block 56, the data generated during monitoring is used to update the reservoir-well model and to undertake a test (determination) at block 58 as to whether the well 10 has reached an "end-of-life?" (which may be determined by any one or more of factors such as the field being depleted, artificial lift having become unprofitable, a water and/or gas cut being too high or more profitable wells coming on line) If yes, such as when the well 10 (and/or a particular leg 16) has reached a critical water/gas cut and/or otherwise becomes uneconomical, further execution of flow control optimization ceases in a step at block 60 for that leg 16 or for the entire well 10. If no, in a feedback step at block 62, the current (monitored) production data and the updated model is used to compare current production of the well 10 and/or each of the legs 16 to the target production of the well 10 and/or each of the legs 16, respectively. This information is then feed into step at block 54 to generate a revised (updated) production forecast and to generate a revised (updated) flow-control strategy for the well 10 and/or each of the legs 16 per step 54. The steps of blocks 54, 56 and 62 are repeated (reiterated) in a loop until such time that the well 10 and/or a leg 16 fails the test 58. In the case of a particular leg 16 failing to meet the test at block 58, the control system 28 may fully or partially close the respective flow control valve 24 and management of the well 10 would continue, but with management and operation of the multilateral well 10 with production from one less leg 16 (if the valve is fully closed) or with production from one leg controllably curtailed (if the valve is partially closed).

U.S. Pat. No. 8,914,268 to Dale et al., provides a disclosure relating to systems and methods of optimizing well operating plans by optimizing well potential relative to effective production capacity in light of dynamic reservoir conditions, dynamic near-well conditions, and dynamic well conditions over space and time, which patent is incorporated herein by reference in its entirety.

Figure 3A:
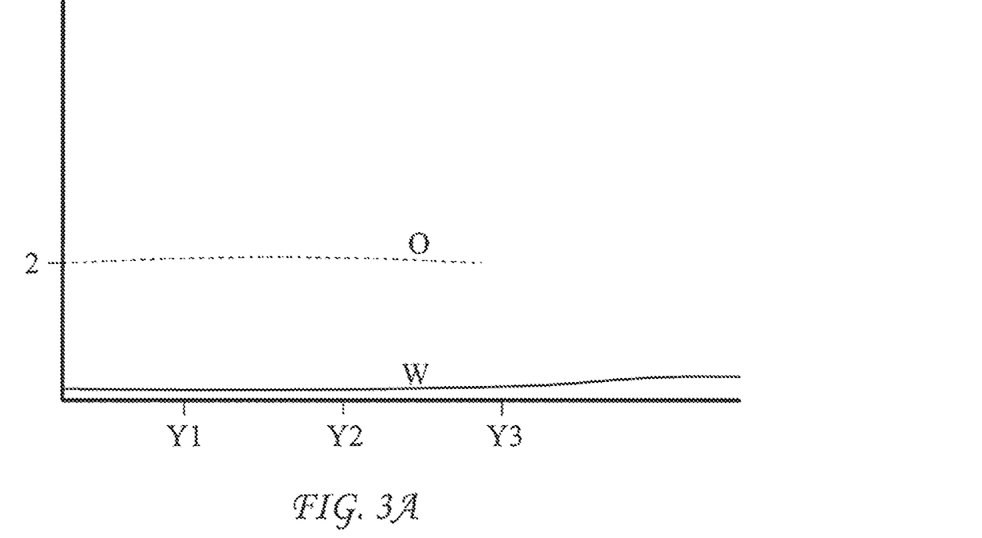
FIG. 3A is a graphical representation of a hypothetical time line of production at a first lateral leg of a multilateral well configured in accordance with an exemplary embodiment of FIG. 1A, wherein O represents oil production and W represents water production.
Figure 3B:
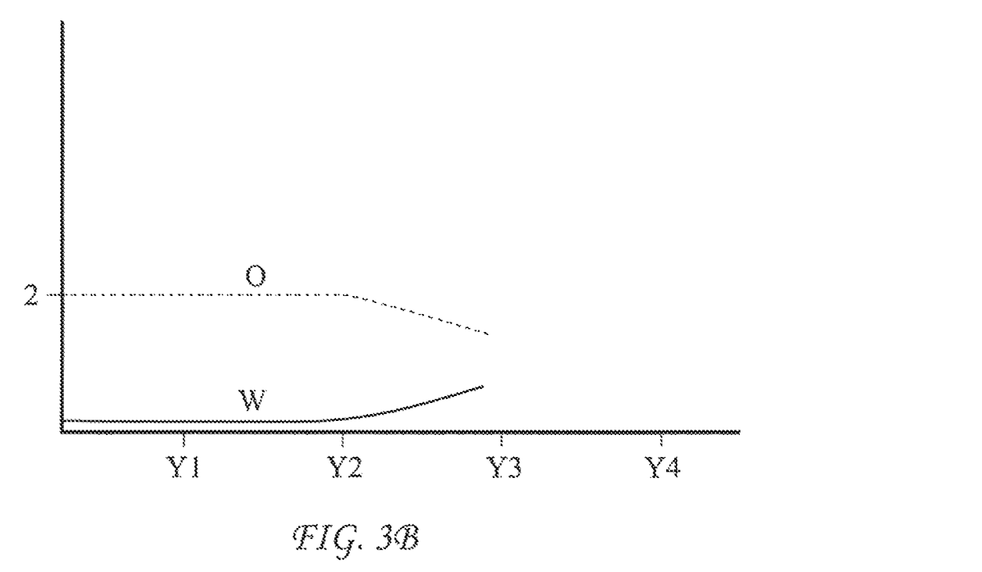
FIG. 3B is a graphical representation of a hypothetical production time line at a second lateral leg of a multilateral well configured in accordance with an exemplary embodiment of FIG. 1A, wherein O represents oil production and W represents water production.
Figure 5:
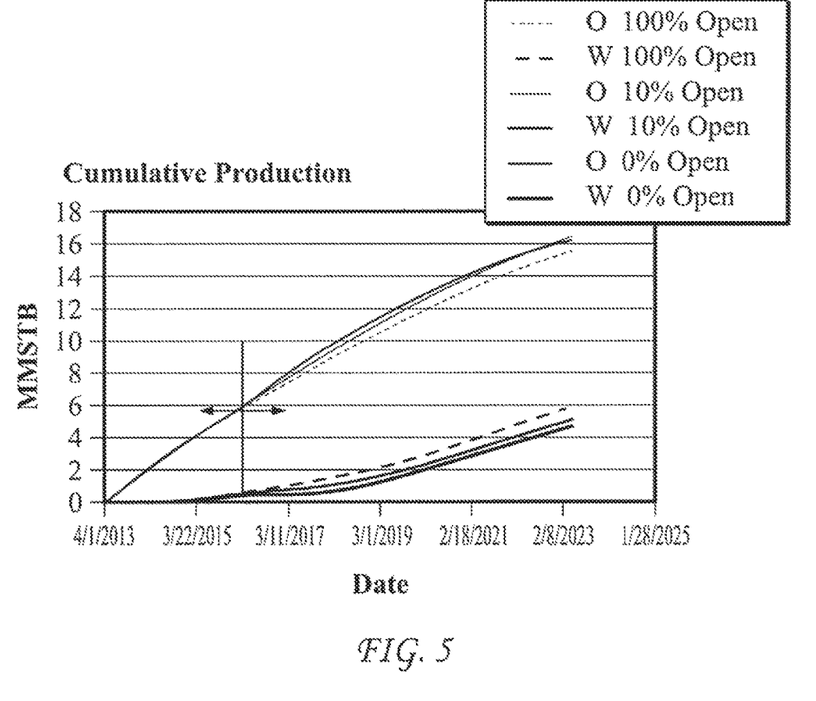
FIG. 5 is a graphical representation of possible accumulated production levels of oil and water over a period of years from a multilateral well configured and operated in accordance with an exemplary embodiment of the disclosure, wherein O represents oil production and W represents water production.

Hypothetical Production Management Example According to the Exemplary Embodiment Referring now to FIGS. 3A, 3B, and 5, a hypothetical multilateral well 10 is constructed in accordance with the above teachings. Referring particularly to FIG. 3A, the completion 22 *a* of a first leg 16*a* of the well 10 is predicted and/or proven to have a consistent production of about 2 million barrels of oil year after year through years 1-4 and beyond, with little to no production of water. The hypothetical well 10 also includes a second completion 22*b* of a second leg 16*b* having an initial production predicted to be about 2 million barrels of oil per year, together with a predicted and/or proven production including at year 3 the beginning of a water breakthrough such that from year 3 and beyond water breakthrough continues to increase to levels that would have been heretofore unacceptable for continuation of production from the leg 16*b*.

Referring now to FIG. 5, in applying the production management control logic 50 of the disclosure, a production target was used to establish respective sizes of the flow control valves 24*a* and 24*b* of the legs 16*a* and 16*b*, together with a production forecast and valve control strategy. During the first three years of production, the strategy includes maintaining both valves 24*a* and 24*b* of the legs 16*a* and 16*b* fully open, with monitoring and updating of the reservoir-well model, the production forecast, and valve strategy as previously described. At year 3, when the monitoring process detects and/or predicts an impending water breakthrough in the second leg 16*b*, production forecasts are generated amongst a plurality of possible valve settings for the second flow control valve 16*b* ranging from fully closed (0% open) to fully open (100% open). As shown in FIG. 5, the forecasted production at the wellhead 12 of the well 10 at the third year indicates that a better valve setting strategy is one which maintains the valve 24*b* of the second leg 16*b* at a setting of 10% open such that the multilateral well 10 produces (or predicted to produce) 16.6 MMSTB, which is an oil uplift of 0.9 MMSTB over an alternative (baseline) strategy of maintaining the valve 24*b* of the second leg 16*b* at a setting of fully open (100% open) which produces (or is predicted to produce) 15.7 MMSTB. In further contrast, the forecasts generated amongst a plurality of possible valve settings for the second flow control valve 16*b* could predict that by leaving the second valve 24*b* fully closed (0% open), the well 10 would produce 16.3 MMSTB (an oil uplift of 0.6 MMSTB over the baseline strategy but 0.3 MMSTB less than the 10% open strategy). Accordingly, management of production of a multilateral wells in accordance with the teachings herein can provide the operator unanticipated gains in total production over time and production optimization responsive to production adverse events and changes in increment contribution to total oil production from a given leg of a multilateral well 10.

In the hypothetical, at or beyond year 3, the larger or mother leg 16 maybe choked to promote operational efficiencies and to execute reservoir management initiatives. For example should one of the legs 16 be closed entirely or substantially, the rate of production amongst the remaining legs 16 might increase due to the absence of contribution from the closed leg. Counteractively, the control system 28 may reset the flow control valve 24 along the larger or mother leg 14 so that the rate of production amongst the remaining legs 16 do not increase, as a group, by amounts that that would otherwise precipitate problems such as cross flows or back flows in the reservoir 18 or amongst the local regions A and B.

Multilateral Flow Control Valve Array (MFCVA)

The teachings herein provide an array of flow control valves 24 in a multilateral well that control output from each lateral leg 16 to the grand total of flow from the well 10 so as to optimize production flow and/or to serve other purposes. In some embodiments, a multilateral flow control valve array (MFCVA) comprises a flow control valve 24 at a location along each leg 16 of a multilateral well 10 at a location uphole of the completion component 22 of the leg 16 and downhole of a confluence of the leg 16 with another leg 16, which valve 24 is remotely operated independently of any ICV's, ICD's, valves, nozzles, chokes or other devices at the completion component 22 of the respective leg 16. Consequently, valve settings and the like at the completion component 22 of a given leg 16 may remain unchanged, while an operator adjusts settings amongst the MFCVA to optimize the contribution of each leg 16 or legs 16 to the grand total of flow produced at the wellhead. The MFCVS may serve other purpose such as executing an operational plan to shift production from one subset of legs 16 to another subset (including individual laterals) responsive to anticipated changes and shifting conditions of a given reservoir 18. The MFCVS also provides the ability to shut off or production test whole sets, sub-sets or individual laterals at a time. In the execution of any of these strategies, the settings of devices at the completion components 22 need not be changed and can remain fixed or adjusted to optimize desired in-flow at each respective completion component of the various legs. Performance of the completion component and management of the flow contribution of each leg of a multilateral well can be managed independently, which simplifies operations and promotes efficiencies in well operations.

Optimizing Injection of a Multilateral Well

The above sections have included teachings of how to optimize production of hydrocarbons from a multilateral well. It is contemplated that the same teachings can be applied to the planning, execution, monitoring and optimization of injection operations (interventions) in a multilateral well over time, either alone or in conjunction with the planning, execution, monitoring and optimization of production operations as previously described, to establish enhanced production through an improved execution of injection via an array of independently controlled, injection-flow control valves.

More particularly and in reference to FIG. 1A, an array of injection-flow control valves 24 in a multilateral well 10 is arranged and managed according to the preceding teachings to control injection flow into each lateral leg 16 where intervention is desired so as to optimize injection-flow and/or to serve other purposes. In an exemplary embodiment, the array comprises injection-flow control valves 24a, 24b at a location along first and second legs 16a, 16b (or more) of a multilateral well 10, which location is uphole of the respective completion components (injectors) 22a, 22b of the legs 16a, 16b, respectively. In some embodiments, the locations of the injection-flow control valves 24a, 24b are located in a downhole relation of a divergence 20 where a common flow of injection fluids is divided between the legs 16a, 16b by a setting in at least one of the flow control valves 24a, 24b or both.

Referring now to FIG. 1b, each completion 22 of the present exemplary embodiment is configured for the injection of treatment fluids into adjacent portions of the formation of the reservoir 18 and may comprise a string 121 of injectors in the form of in-flow control devices (ICD's) 123, 123', 123" located within a wellbore 127 of a leg 16 in the formation of the reservoir 18. The ICD's 123 may each comprise a screen 129 and a housing portion 131 that includes internal nozzles and/or valves to control the rate of flow of treatment fluids being pumped from the wellhead 12 into the formation 121 though the ICD's 123. The ICD's 123 may be operatively separated from one another by a plurality packers 125, 125', 125", 125'" and are commercially available from The Halliburton Company of Houston, Tex., Schlumberger Technology Corporation of Sugar Land, Tex., the Baker Hughes Incorporated, Weatherford International and other sources. In practice the completion 22 may be configured differently and may be constructed from components entirely different from what is described herein with reference to FIG. 1B.

In some embodiments, each valve 24 is remotely operated independently of any other valve of the array and independently of ICD's, valves, chokes or other devices at the completion component 22 of the legs 16. Consequently, valve settings and the like at the completion component 22 of a given leg 16 may remain unchanged, while an operator adjusts settings amongst the valves 24 of the array to individually optimize the level of intervention amongst the completions of legs where intervention is desired. The array may serve other purposes such as executing an operational plan to shift intervention from one subset of legs 16 to another subset (including individual laterals) responsive to anticipated, predicted or detected changes and shifting conditions of a given reservoir 18. Such capability is particularly advantageous in embodiments such as shown in FIGS. 1C, 1D and 1E, wherein additional sets of valves 24 (such as set 24; sets 24a, 24b; sets 24a', 24b'; and sets 24a", 24b") are established further and further along the string of lateral legs 16. In this regard, the array also provides the ability to shut off or test whole sets, sub-sets (including individual laterals) at a time. In the execution of any of these strategies, the settings of devices at the completion components 22 need not be changed and can remain fixed or adjusted to optimize desired injection at each respective completion component of the various legs. Performance of the completion component and management of the injection flow at each leg of a multilateral well can be managed independently, which simplifies operations and promotes efficiencies in well-injection operations.

It is noted that with an extensive array of injection-flow valves 24 such as shown in FIG. 1E (wherein the array may comprise set 24; sets 24a', 24b'; and sets 24a", 24b"), fluid communication along the mother leg 16a may be maintained despite a closure or partial closure of one or more secondary (tertiary) legs 16ai, 16aii. In addition, with the location of the associated valve sets 24a' and 24a" being downhole from the corresponding divergences 20a' and 20a", respectively, the strings (tubulars) uphole of the corresponding divergences 20a' and 20a" need not be encumbered with (may be free of) valve bodies effecting the closures. Likewise, the line of fluid communication through the divergences 20a' and 20a" which are to remain open need not be encumbered with valve bodies effecting the closures.

Data regarding the nature and rate of injection from each leg may be acquired from downhole sensors located at or about each injection-flow control valve 24. In lieu or in addition, data may be acquired from sensors indigenous to the respective completion components 22, if available. The acquired data may be processed through a reservoir-well computerized model to resolve optimal valve settings across the valve array In some embodiments, the system provides a capacity to optimize injection from the multilateral well 10 by controlling injection contribution of each lateral leg 16, where intervention is desired, in accordance with a plan to achieve a long-term injection target for each leg 16 and/or for the reservoir regions A and B and/or for the reservoir 18 itself and a reiterated assessment of progress against the plan. The valve settings may be adjusted according to output from running a computerized reservoir-well model that generates an injection forecast comprising simulated injection performance and/or effect over time as a function of simulated valve sizes and simulated valve settings of a simulated, array of injection-flow control valves 24 as described herein. Injection management and optimization may include monitoring injection data generated by downhole sensors and other sensors, updating a computerized reservoir-well simulation based upon the data, running the simulation to generate both an injection forecast and a control strategy for the array. Injection management and optimization may also include comparing the injection data to an injection target and/or production target and adjusting the injection valve strategy accordingly. Injection management may be integrated into the production management of the multilateral well, when both are configured and executed as described herein.

Likewise, the above teachings may be applied to construct and operate a well such as shown in FIGS. 1A-E, wherein one leg 16a may be configured for the production of hydrocarbons from production regions of a reservoir 18 and the other leg 16b may be configured for the injection of formation treatments into the same or different regions of the reservoir 18 and/or regions outside of the reservoir 18. It is noted that with the embodiments shown in FIGS. 1A and C, the entire production operation and the entire injection operations may be conveniently coordinated simply and expediently through operation of just two valves 24a, 24b and resort to the management and optimization techniques disclosed above. With the more extensive valve array of the embodiment shown in FIGS. 1D and E, the aforementioned management and optimization techniques may be simply and expediently applied more exactly and regionally.

INDUSTRIAL APPLICABILITY

The apparatus and methods disclosed herein are applicable to the oil and gas industry.

While aspects of the present disclosure may be susceptible to various modifications and alternative forms, the exemplary embodiments discussed above have been shown by way of example. It should again be understood that the disclosure is not intended to be limited to the particular embodiments disclosed herein. Indeed, the present disclosure includes all modifications, equivalents, and alternatives falling within the spirit and scope of the appended claims.

What is claimed is:

1. A system operative in a multilateral well comprising a plurality of legs and a completion component at a location along each of the legs operative to produce a production flow into the respective leg, the system comprising:
   a multilateral flow control valve array comprising;
      a flow control valve at a location along each of the legs, the location in an uphole relation to the completion component of the respective leg and for each respective leg, a confluence between the respective leg and a second leg is in an uphole relation to the valve of the respective leg; and
      a control arrangement to adjust a setting of each flow control valve independently of one another and independently of operation of the completion components; wherein the control arrangement further monitors for an indicator of a negative production event among the lateral legs.

2. The system of claim 1, wherein the control arrangement includes a reservoir-well simulation and is programmed to establish respective valve sizes and initial valve settings of the control valves of the multilateral well upon a running of the reservoir-well simulation with an input of a production target.

3. The system of claim 2, wherein the adjustable valve setting comprises a value indicative of a percentile opening of the respective flow control valve.

4. The system of claim 3, wherein the negative production event comprises any of a water production, a gas production, a sand production, a compaction and a combination of any of the foregoing.

5. The system of claim 3, wherein the control arrangement is programmed upon a detection of a negative production event in an affected one of the lateral legs, to change the respective valve setting to a value in the range of 0 to 100% open in the affected lateral leg such that an uplift in production is predicted.

6. The system of claim 3, wherein the control arrangement is programmed upon a detection of a negative production event in an affected one of the lateral legs, to reduce the respective valve setting to approximately 20% open or less in the affected lateral leg.

7. The system of claim 2, wherein the control arrangement is programmed to produce a production forecast comprising simulated well performance over time as a function of simulated valve sizes and simulated valve settings of simulated, flow control valves.

8. The system of claim 1, wherein the locations of the respective leg and second leg flow control valves are downhole of the confluence of the respective and second legs.

9. A method of optimizing production from a multilateral well comprising:
   producing along a production portion of each lateral leg of the multilateral well;
   operating a flow control valve at a location along each lateral leg of the multilateral well, the location in an uphole relation to the production portion of the respective lateral leg;
   comingling the produced flow of each respective lateral leg with the produced flow of a second lateral leg at a confluence that is in an uphole relation to the valve of the respective lateral leg,
   monitoring production of each lateral leg of the multilateral well and adjusting operation of one or more of the flow control valves responsively to;
      a variance between the monitored production and a production target; and/or
      a detection of a production adverse event;
      wherein the adjusting includes running a computerized reservoir-well simulation of the multilateral well to resolve responsive, simulated valve settings of simulated, flow control valves and adjusting the settings of the flow control valves of the multilateral well accordingly; and
   wherein the monitoring and adjusting includes: upon detecting a negative production event in an affected one of the lateral legs, changing the respective valve setting to a value in the range of 0 to 100% open in the affected lateral leg such that an uplift in production over time is predicted.

10. The method of claim 9, wherein the running of the computerized reservoir-well simulation includes generating a production forecast comprising simulated well performance over time as a function of simulated valve sizes and simulated valve settings of simulated, flow control valves.

11. A method of managing production of a multilateral well comprising a plurality of well completions, a plurality of lateral legs communicating the plurality of well completions with an uphole string and a plurality of flow control valves at locations along the lateral legs in an uphole relation to the well completions, the method comprising:
   setting a production target;
   running a model reservoir-well simulation of the multilateral well including simulated, flow control valves along simulated legs in an uphole relation to simulated well completions to generate a production forecast comprising simulated well performance over time as a function of simulated valve sizes and simulated valve settings of the simulated, flow control valves;
   generating well production data while operating the flow control valves of the multilateral well in accordance with the simulated valve sizes and the simulated valve settings wherein the generating well production data includes monitoring for an indicator of a negative production event amongst the lateral legs;
   updating the model reservoir-well simulation responsively to the generated well production data;
   comparing the generated well production data to the production target and running the model reservoir-well simulation to establish a revised production forecast and/or to establish revised valve settings for the flow control valves;
   repeating the generating, the updating and the comparing during a production life of the well.

12. The method of claim 11, further comprising: while running the model reservoir-well simulation, inputting the production target to establish the sizes of the flow control valves of the multilateral well.

13. The method of claim 11, wherein the valve setting comprises a value indicative of a percentile opening of the respective simulated valve and/or the respective flow control valve of the well.

14. The method of claim 11, wherein the negative production event comprises any of a water production, a gas production, a sand production, a compaction and a combination of any of the foregoing.

15. The method of claim 11, wherein the monitoring and establishing revised valve settings includes: upon detecting a negative production event in an affected one of the lateral legs, changing the respective valve setting to a value in the range of 0 to 100% open in the affected lateral leg such that an uplift in production over time is predicted.

16. The method of claim 15, wherein upon a detection of a negative production event in an affected one of the lateral legs, the establishing revised valve settings reduces the valve setting to approximately 20% open or less in the affected lateral leg.

17. The method of claim 11, further comprising: operating the flow control valves at a location downhole of a confluence of the respective lateral legs.

18. A system associated with production of hydrocarbons, comprising:
　a computerized reservoir-well simulation of a multilateral well comprising a plurality of well completions, a plurality of lateral legs communicating the plurality of well completions with an uphole string and a plurality of flow control valves at locations along the lateral legs in an uphole relation to the well completions;
　a first sensor responsive to production from a first well completion of a multilateral well;
　a second sensor responsive to production from a second well completion of a multilateral well;
　a first flow control valve operable at a location in an uphole relation to a completion component of a first leg of a multilateral well and operable to selectively control a first flow of production from the first leg according to a first adjustable valve setting;
　a second flow control valve operable at a location in an uphole relation to a completion component of a second leg of a multilateral well and operable to selectively control a second flow of production from the second leg according to a second adjustable valve setting;
　the locations of the first and second flow control valves are in a downhole relation to a confluence of flows from the first and second legs;
　a controller programmed to:
　　monitor production by generating production data based upon an output of a sensor of the multilateral well;
　　monitor for an indicator of a negative production event amongst the lateral legs;
　　update the computerized reservoir-well simulation based upon an output of a sensor of the multilateral well;
　　run the computerized reservoir-well simulation to generate a production forecast responsive to the production target and executing a control strategy for the first and second flow control valves of the multilateral well consistent with the production forecast; and
　　compare the generated production data to the production target and adjusting execution of the control strategy responsively to the comparison.

19. The system of claim 18, wherein the controller is further programmed to establish respective sizes and initial valve settings of the flow control valves of the multilateral well upon a running of the reservoir-well simulation with an input of a production target.

20. The system of claim 18, wherein the adjustable valve setting comprises a value indicative of a percentile opening of the respective flow control valve.

21. The system of claim 18, wherein the negative production event comprises any of a water production, a gas production, a sand production, a compaction and a combination of any of the foregoing.

22. The system of claim 18, wherein the controller is programmed upon detecting a negative production event in an affected one of the lateral legs, changing the respective valve setting to a value in the range of 0 to 100% open in the affected lateral leg such that an uplift in production over time is predicted.

23. The system of claim 22, wherein the controller is programmed upon a detection of a negative production event in an affected one of the legs, to possibly reduce the respective valve setting to approximately 20% open or less in the affected leg.

24. The system of claim 18, wherein the location of the first and second flow control valves is downhole of the confluence.

25. The system of claim 18, wherein the production forecast comprises simulated well performance over time as a function of simulated valve sizes and simulated valve settings of simulated, flow control valves.

26. A multilateral flow control valve array operative in a multilateral well comprising a plurality of lateral legs, a completion component at a location along each of the lateral legs and a confluence of lateral legs, the multilateral flow control valve array comprising:
　a flow control valve at a location along each leg of the plurality of lateral legs, for each respective leg the location of the flow control valve being in an uphole relation to the completion component of the respective leg and production flows of the respective leg and a second leg comingling at a confluence that is in an uphole relation to the flow control valve of the respective leg; and
　a control arrangement to adjust a setting of each flow control valve independently of one another and independently of operation of the completion components; wherein the control arrangement further monitors for an indicator of a negative production event among the lateral legs.

27. The multilateral flow control valve array of claim 26, wherein the adjusting includes adjusting responsively to a monitored progress relative to an operational target.

28. The multilateral flow control valve array of claim 27, wherein the completion component is an injector, the flow control valve comprises an injection-flow control valve and the operational target is at least one of an injection target and a production target.

29. The multilateral flow control valve array of claim 27, wherein the first leg is a production leg and the second leg is an injection leg.

30. The multilateral flow control valve array of claim 27, wherein the first leg is a mother leg, the array further comprising sets of first and second flow control valves at spaced locations along the mother leg.

31. A system operative in a multilateral well comprising a plurality of legs and a completion component at a location along each of the legs, the system comprising:
　a multilateral flow control valve array comprising:
　　a flow control valve at a location along each of the legs, for each respective leg, the location being between the completion component of the respective leg and a confluence between the respective leg and a second leg, wherein the locations of the respective leg flow control valves are downhole of the confluence of the respective legs; and a control arrangement to adjust a setting of each flow control valve independently of one another and independently of operation of the completion components; wherein the control arrangement monitors for an indicator of a negative production event among the lateral legs.

32. The system of claim 31, wherein the completion component includes at least one of an ICD, an ICV, a valve, a nozzle and/or a choke.

\* \* \* \* \*